United States Patent
Sakai et al.

(10) Patent No.: US 11,745,301 B2
(45) Date of Patent: Sep. 5, 2023

(54) ROTARY TOOL

(71) Applicant: Koki Holdings Co., Ltd., Tokyo (JP)

(72) Inventors: Hironori Sakai, Ibaraki (JP); Takuya Yoshinari, Ibaraki (JP); Hironori Mashiko, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 1011 days.

(21) Appl. No.: 16/499,319

(22) PCT Filed: Feb. 23, 2018

(86) PCT No.: PCT/JP2018/006761
§ 371 (c)(1),
(2) Date: Sep. 29, 2019

(87) PCT Pub. No.: WO2018/180083
PCT Pub. Date: Oct. 4, 2018

(65) Prior Publication Data
US 2020/0055159 A1 Feb. 20, 2020

(30) Foreign Application Priority Data

Mar. 30, 2017 (JP) .................................. 2017-066513
Mar. 30, 2017 (JP) .................................. 2017-066517

(51) Int. Cl.
*H02K 7/10* (2006.01)
*B24B 23/02* (2006.01)
(Continued)

(52) U.S. Cl.
CPC .............. *B24B 23/022* (2013.01); *B24B 47/12* (2013.01); *B25F 5/00* (2013.01); *H02P 1/04* (2013.01); *H02P 6/24* (2013.01); *B25F 5/008* (2013.01)

(58) Field of Classification Search
CPC .......... B24B 23/022; B24B 47/12; B25F 5/00; H02P 1/04; H02P 6/24; H02P 29/40
See application file for complete search history.

(56) References Cited

U.S. PATENT DOCUMENTS

| 1,429,741 | A | * | 9/1922 | Torsten | ................... | B23D 7/00 |
| | | | | | | 409/323 |
| 6,518,719 | B1 | | 2/2003 | Suzuki et al. | | |
| 2011/0148332 | A1 | | 6/2011 | Kawano et al. | | |

FOREIGN PATENT DOCUMENTS

| JP | 2000304024 | 10/2000 |
| JP | 2010269409 | 12/2010 |

(Continued)

OTHER PUBLICATIONS

"Office Action of China Counterpart Application" with English translation thereof, dated Apr. 6, 2022, p. 1-p. 9.

(Continued)

*Primary Examiner* — Karen Masih
(74) *Attorney, Agent, or Firm* — JCIPRNET

(57) ABSTRACT

Provided is a rotary tool. In the rotary tool, the rotating tip tool is mounted on a spindle by the fixture, and the spindle and the tip tool are rotated by a motor. The rotary tool has a switch which can switch the motor between a rotation state and a stop state, and a control device which controls the rotation of the motor corresponding to the operation of the switch. When the switch is turned off after a required time T elapses after the motor is started, the control device stops the rotary tool (104d, 106d) by performing a common braking operation on the spindle, and when the switch is turned off before the required time T elapses after the motor is started, the control device stops the tip tool (101d) by inertia without applying a braking force.

18 Claims, 13 Drawing Sheets

(51) Int. Cl.
*B24B 47/12* (2006.01)
*H02P 1/04* (2006.01)
*B25F 5/00* (2006.01)
*H02P 6/24* (2006.01)

(56) References Cited

FOREIGN PATENT DOCUMENTS

| | | |
|---|---|---|
| JP | 2013165677 | 8/2013 |
| JP | 2014233793 | 12/2014 |
| JP | 2015100156 | 5/2015 |
| JP | 2015160284 | 9/2015 |
| JP | 2017013166 | 1/2017 |
| WO | 2016084553 | 6/2016 |
| WO | 2016098563 | 6/2016 |
| WO | 2016174971 | 11/2016 |
| WO | WO-2019201717 A1 * 10/2019 ............. B24B 33/02 |

OTHER PUBLICATIONS

"International Search Report (Form PCT/ISA/210)" of PCT/JP2018/006761, dated May 1, 2018, with English translation thereof, pp. 1-4.
"Search Report of Europe Counterpart Application", dated Apr. 14, 2021, pp. 1-7.

* cited by examiner

ROTARY TOOL

CROSS-REFERENCE TO RELATED APPLICATION

This application is a 371 application of the international PCT application serial no. PCT/JP2018/006761, filed on Feb. 23, 2018, which claims the priority benefit of Japan application no. 2017-066513, filed on Mar. 30, 2017 and no. 2017-066517, filed on Mar. 30, 2017. The entirety of each of the above-mentioned patent applications is hereby incorporated by reference herein and made a part of this specification.

BACKGROUND

Technical Field

The present invention relates to a rotary tool that rotates a tip tool, in which a fixture that fixes the tip tool is prevented from being loosened.

Related Art

A rotary tool that rotates a tip tool by using an electric motor is known. Patent Literature 1 discloses a grinder taking a brushless DC motor as a driving source. In the grinder, an inverter circuit is installed to supply a rotating magnetic field (three-phase AC) to a coil of the motor, a rotational position of a rotor is detected using a magnetic sensor, and a driving current supplied to the coil of the motor is controlled by a controller. A rotating force of the motor is transmitted to a spindle via two bevel gears. A rotating tip tool such as a grindstone is attached to the spindle. In a method for fixing the tip tool to the spindle, a male screw is formed at a side of the spindle, and a fixture having a female screw is screwed with the spindle after the spindle passes through a through-hole of the tip tool. The rotating spindle receives large load torque via the rotating tip tool, and thus the spindle receives a force by which the tip tool is rotated in a direction opposite to rotational torque of the spindle. Therefore, directions of a screw thread of the spindle and a screw thread of the fixture are determined so that the fixture is not loosened during an operation of the tip tool and the fixture is fastened when the grindstone is rotated in a direction opposite to a rotational direction of the spindle.

In recent years, in a rotary tool which rotates a tip tool in one direction like a grinder or a circular saw, a technique of applying a brake when a switch of a motor is turned off so as to rapidly stop the tip tool as described in Patent Literature 2 is realized. In Patent Literature 2, when the switch selects to turn off the motor, a braking force due to friction is applied to the motor. Therefore, a brake mechanism is arranged to be coaxial with a rotary shaft of the motor. As another brake mechanism, a brake mechanism of applying an electrical brake by causing a short circuit of a coil of a brushless motor is proposed in Patent Literature 3.

LITERATURE OF RELATED ART

Patent Literature

Patent Literature 1: Japanese Laid-Open Publication No. 2010-269409

Patent Literature 2: Japanese Laid-Open Publication No. 2017-13166

Patent Literature 3: Japanese Laid-Open Publication No. 2013-165677

SUMMARY

Problems to be Solved

When a brake mechanism is applied which is automatically operated when a switch of a motor is turned off in a rotary tool, a tip tool can be rapidly stopped. However, when a strong brake is applied, the tip tool is to continue rotating due to inertia with respect to the spindle that is to be decelerated, and thus a force by which the spindle and the tip tool are relatively rotated is generated, and loosening torque is generated in a direction in which a fixture having a screw thread is loosened. On the other hand, during the start of the motor, the spindle is accelerated with respect to the motionless tip tool, and thus fastening torque is generated in a direction in which the fixture having the screw thread is fastened. In the rotary tool having such features, when an operator repeats an operation of turning off the switch and applying a brake immediately after the switch of the motor is turned on to start the motor, there is a concern that the loosening torque will increase to a magnitude larger than that of the fastening torque and the fixture is loosened from the spindle.

The present invention is made with consideration of the background described above, and thus an objective thereof is to provide a rotary tool in which, when a switch is turned off to stop a tip tool, a fixture that fixes the tip tool is prevented from being loosened. Another objective of the present invention is to provide a rotary tool in which whether or not to apply a brake that stops a tip tool when a switch is turned off is optimally controlled so that a fixture is prevented from being loosened. Still another objective of the present invention is to provide a rotary tool in which, immediately after a switch is turned on, fastening torque for fastening a fixture that fixes a tip tool is reliably applied.

Means to Solve Problems

Representative features of the inventions disclosed in the present application are described as follows. According to a feature of the present invention, there is provided a rotary tool in which a tip tool is mounted on a spindle by a fixture. The spindle is rotated forward by a motor. The fixture is screwed to the spindle by rotating the fixture backward relative to the spindle. The rotary tool includes a switch and a control device which controls a rotation and a stop of the motor according to an operation of the switch. When the switch is turned on, the control device performs a start control to the motor such that to decrease a rotation speed of the motor to reach a set target rotation speed after increasing the rotation speed of the motor to be higher than the target rotation speed. If the switch is turned off before the required rotation elapses, the braking force is reduced. A state after "the required rotation elapses" means a state in which a predetermined time elapses after the switch is turned on and the motor starts accelerating, or a state in which a rotation speed of the motor reaches a predetermined rotation speed after the switch is turned on.

According to another feature of the present invention, a screw portion is formed in the spindle, a fastener having a screw portion corresponding to the spindle-side screw portion is arranged, and the tip tool is fastened and fixed to the spindle by rotating the fastener in an orientation opposite to a rotational direction of the spindle during an operation. For example, a male screw may be formed at a tip of the spindle, the tip tool may have a through-hole which the spindle penetrates, and the fastener may be a nut having a female screw at an inner circumferential side of the through-hole.

According to still another feature of the present invention, a plurality of coils is wound around a stator of the motor, and the control device performs electrical braking by causing a short circuit between the coils. For example, the motor is a three-phase brushless motor and has an inverter circuit which controls the motor by a plurality of switching elements, and the control device controls the inverter circuit so as to cause short circuit between the coils. The control device can adjust a strength of braking by changing the number of short-circuit phases and/or a short-circuit time of the motor by the switching elements.

Effect

According to the present invention, when a switch of a rotary tool is turned off to stop a tip tool, whether to apply a brake, to stop applying the brake, or to limit the application of the brake is determined according to a fastening amount during start, and thus it is possible to effectively prevent a loosening phenomenon of a fixture for fixing the tip tool to a spindle.

DESCRIPTION OF THE EMBODIMENTS

Example 1

Figure 1:
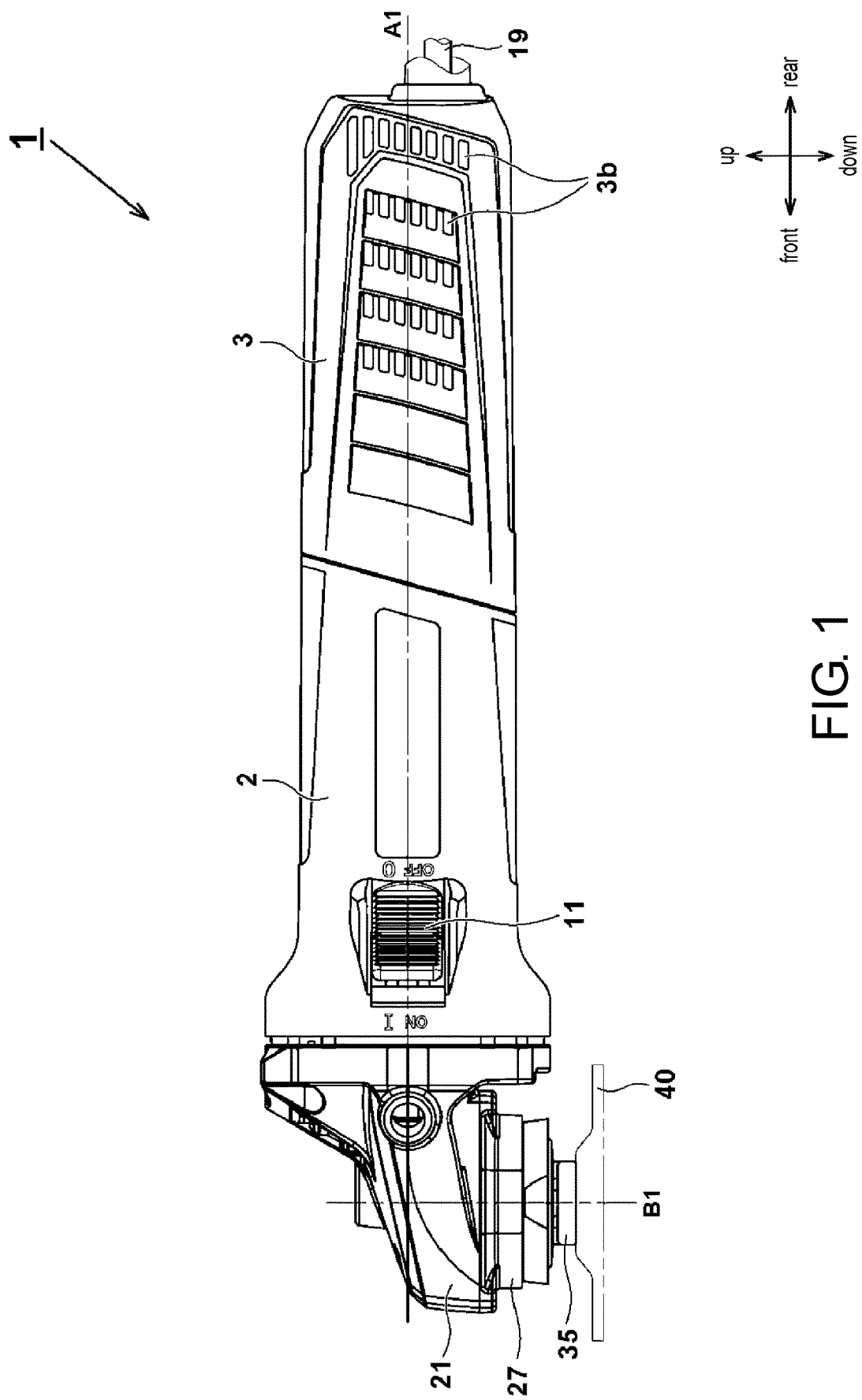
FIG. 1 is a side view of a rotary tool 1 according to an example of the present invention.

An example of the present invention is described below with reference to the drawings. Moreover, in the following drawings, the same reference signs are assigned to portions having the same functions, and the description thereof is not repeated. In addition, in this specification, front, rear, right, left, upward, and downward directions are described as directions shown in the drawings.

FIG. 1 is a side view of a rotary tool 1 according to an example of the present invention. Here, a disc grinder is described as an example of the rotary tool 1, the disc grinder including a spindle that rotates around an axial line B1 orthogonal to an axial line A1 of a cylindrical housing and a circular grindstone 40 serving as a work instrument fixed to the spindle. The housing (outer frame or case body) of the rotary tool 1 is configured of three parts, that is, a gear case 21 that accommodates a power transmission mechanism, a tubular motor housing 2 that accommodates a motor, and a rear cover 3 that is attached at a rear side of the motor housing 2 and accommodates electrical instruments. A shape or a dividing mode of the housing is not limited. Thus, the housing may be configured of three parts divided in a front-rear direction as described in the example or may be formed in other division shapes. The motor housing 2 is an integral configuration of a resin or metal and is configured into a substantially cylindrical shape having an opening at a front side. The rear cover 3 is attached at the rear side of the motor housing 2. The rear cover 3 is configured to be divided in a right-left direction at a vertical plane through a central axis (axial line A1 which is an extension line of a rotary shaft of the motor) in a longitudinal direction and is fixed with a screw not illustrated. A plurality of ventilating windows 3b for taking in external air is arranged at right and left surfaces of the rear cover 3. In addition, a power cord 19 for supplying a commercial power source is arranged at a rear end of the rear cover 3.

A switch lever 11 that switches the motor described later between a rotation state and a stop state is arranged at a left surface of the motor housing 2. The switch lever 11 is operated in a sliding manner in the front-rear direction and comes into a switch-off state when being positioned at a rear side as shown in FIG. 1 and comes into a switch-on state when being positioned at a front side.

Figure 2:
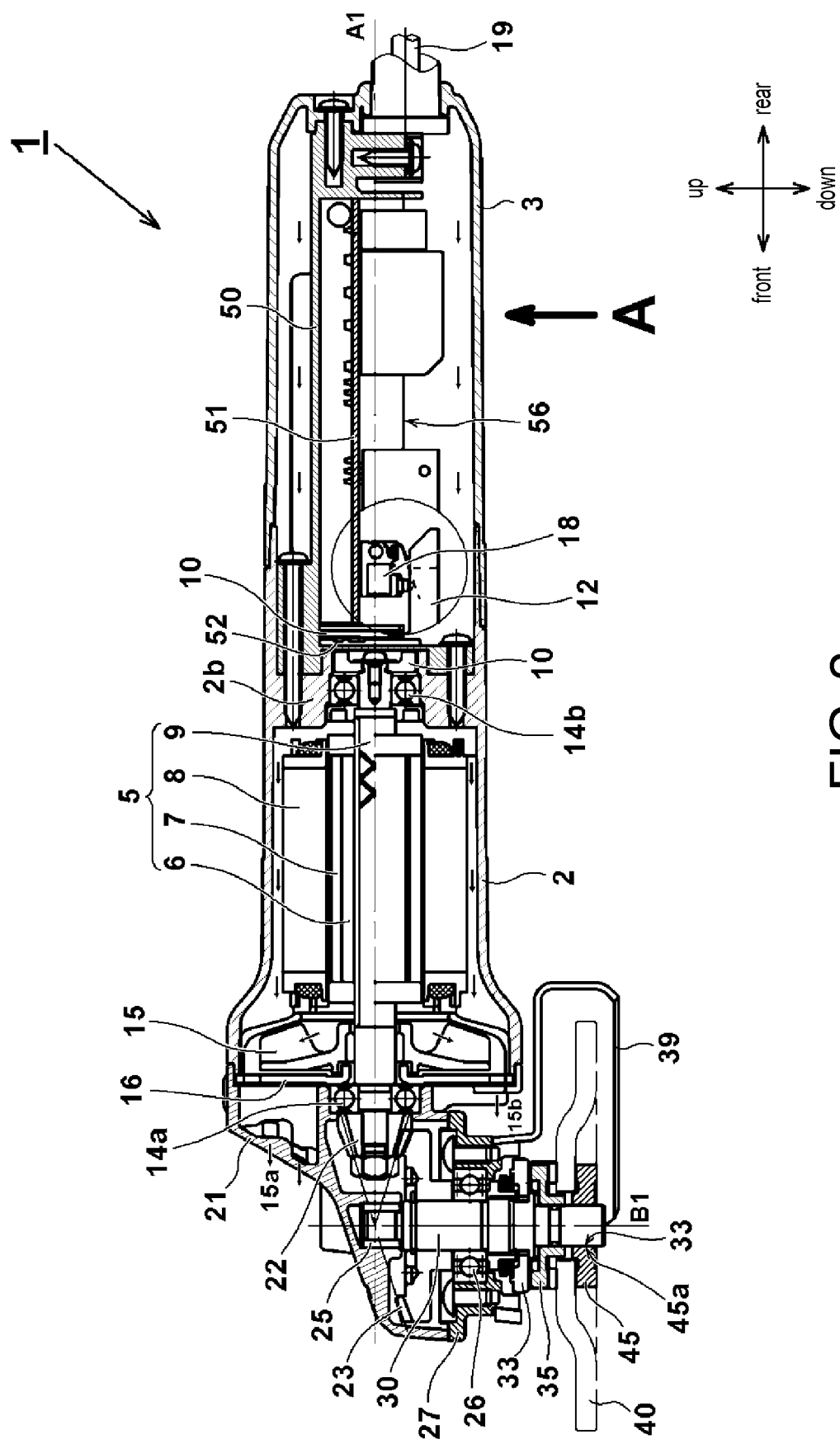
FIG. 2 is a longitudinal sectional view showing an overall structure of the rotary tool 1 according to the example of the present invention.

FIG. 2 is a longitudinal sectional view showing an overall structure of the rotary tool 1. A motor 5 is a brushless DC motor, and a rotary shaft 9 is disposed along a central axis direction (front-rear direction) of the motor housing 2. The motor 5 is a so-called inner rotor type in which a rotor 6 rotates in a space at an inner circumferential side of a stator 8. In the stator 8, a coil is formed by winding a copper wire around a core manufactured in a stacked structure in which multiple thin iron plates having an annular shape punched by press working are stacked in an axial direction. In the example, the coil has star connection having three phases of U, V, and W phases; however, the coil may have delta connection. A flat permanent magnet 7 having an N pole and an S pole is arranged in the rotor 6.

The rotary shaft 9 is rotatably held by a front bearing (first bearing) 14a which is fixed in the vicinity of a connection portion between the gear case 21 and the motor housing 2 and a rear bearing (second bearing) 14b which is fixed to the motor housing 2. A cooling fan 15 is arranged between the bearing 14a and the motor 5 when viewed in the axial direction of the rotary shaft 9. The cooling fan 15 is, for example, a plastic centrifugal fan, and is attached to the rotary shaft 9 of the motor 5 to generate, by rotation of the motor 5, flow of air (cooling air) for cooling the motor 5, a control circuit, or the like in directions represented by a plurality of black arrows inside the housing. The cooling air is suctioned from the ventilating windows 3b (refer to FIG.

1) arranged at both right and left surfaces of the rear cover 3, flows around the case 50 accommodating the circuit board 51 from the rear side to the front side, passes through an opening (not shown) arranged in a bearing holder 2b of the motor housing 2, and flows into an accommodation space of the motor 5. The cooling air flowing into the accommodation space of the motor 5 is suctioned by the cooling fan 15 through a gap (refer to black arrows in the drawings) between the motor housing 2 and an outer circumferential side of the stator 8 or an inner space of the stator 8 and is discharged toward the front side as shown by an arrow 15a from a through-hole of the gear case 21 through a through-hole of a fan cover 16 or toward the front as shown by an arrow 15b from a lower bore of the fan cover 16.

The gear case 21 is configured by integral forming of metal such as aluminum for example, accommodates a set of bevel gear mechanisms (22 and 23), and rotatably holds the spindle 30 which is an output shaft. The axial line B1 of the spindle 30 is disposed to extend in a direction (here, up-down direction) substantially orthogonal to the axial line A1 of the rotary shaft 9 of the motor 5. The first bevel gear 22 is arranged at a front end region of the rotary shaft 9, and the first bevel gear 22 intermeshes with the second bevel gear 23 attached to an upper end portion of the spindle 30. The second bevel gear 23 has a larger diameter and a larger number of gears than the first bevel gear 22, and thus these power transmitting means acts as a deceleration mechanism. An upper end side of the spindle 30 is rotatably supported by a metal 25 in the gear case 21, the vicinity of a center of the spindle 30 is rotatably supported by a bearing 26 made of a ball bearing. The bearing 26 is fixed to the gear case 21 via a spindle cover 27.

A support body 33 is arranged at a tip of the spindle 30, and a tip tool such as the grindstone 40 is mounted at a lower side of the support body 33. The grindstone 40 is fixed by being pinched between a wheel washer 35 and a washer nut 45. The grindstone 40 is a flexible grindstone, a resinoid grindstone, a sanding disc, or the like having a diameter of 100 mm for example, and is capable of performing surface polishing and curved-surface polishing of metal, synthetic resins, marble, concrete, or the like by selecting a type of abrasive grains to be used. A wheel guard 39 covers an outer side in a radial direction at a rear side and an upper side of the grindstone 40. Moreover, the tip tool mounted on the rotary tool 1 is not limited to the grindstone 40, and other tools such as a bevel wire brush, a non-woven brush, or a diamond wheel may be attached.

A sensor magnet 10 which is a magnetic body having a magnetic pole changing in a rotational direction is attached to a rear end of the rotary shaft 9 of the motor 5. The sensor magnet 10 is a permanent magnet having a thin columnar shape and attached to detect a rotational position of the rotor 6, and poles are formed in NSNS order at 90-degree intervals in a circumferential direction. A substantially semi-circular sensor board 52 disposed in a direction perpendicular to the rotary shaft 9 is arranged in an inner region of the case 50, which is the back of the sensor magnet 10, and a rotational-position detecting element 69 that detects a position of the sensor magnet 10 is arranged at the sensor board 52. The rotational-position detecting element 69 detects a change in magnetic field of the rotating sensor magnet 10, thereby detecting a rotational position of the rotor 6. For example, three hole ICs are used and are disposed at every predetermined angle, here, at every 60°, in the rotational direction.

Inside the rear cover 3 formed into a substantially cylindrical shape, a control device (control circuit 70 described later) that controls rotation of the motor 5, an inverter circuit for driving the motor 5, and a power circuit for converting an alternating current supplied from outside by a power cord (not shown) into a direct current are accommodated. In the example, the circuits are installed at the circuit board 51 which is disposed in parallel with the central axis (coaxial to the rotary shaft 9 of the motor 5) of the rotary tool 1 in the longitudinal direction. The circuit board 51 is disposed inside the container-like case 50 in which one surface at a lower side is an opening portion, switching elements Q1 to Q6 are disposed from the board in a downward direction, and the circuit board 51 is hardened to a portion of the case 50 at a predetermined depth by a hardening resin obtained by hardening a liquid resin. Here, a liquid level of a resin 56 reaches a half of or higher than a depth of the case. The bearing holder 2b of the motor housing 2 has a structure in which a plurality of support posts (not shown) are formed toward an outer side from a cylindrical region which holds an outer ring region of the bearing 14b (refer to FIG. 2), and a cavity is formed in the location other than locations of the support posts, and thus cooling air flows to a space in which a side of the motor 5 is accommodated from a space in which the case 50 is accommodated. In a space (in a container) demarcated by the case 50, a switch 18 and the sensor board 52 at which the rotational-position detecting element 69 is installed are arranged in addition to the circuit board 51. The switch 18 switches the motor 5 between ON and OFF states and switches between the ON state and the OFF state, depending on whether a plunger region is pushed down or is opened by a coupling arm 12 that moves in conjunction with a switch lever 11. The sensor board 52 is disposed to be orthogonal to a rotary shaft direction of the motor 5.

Figure 3:
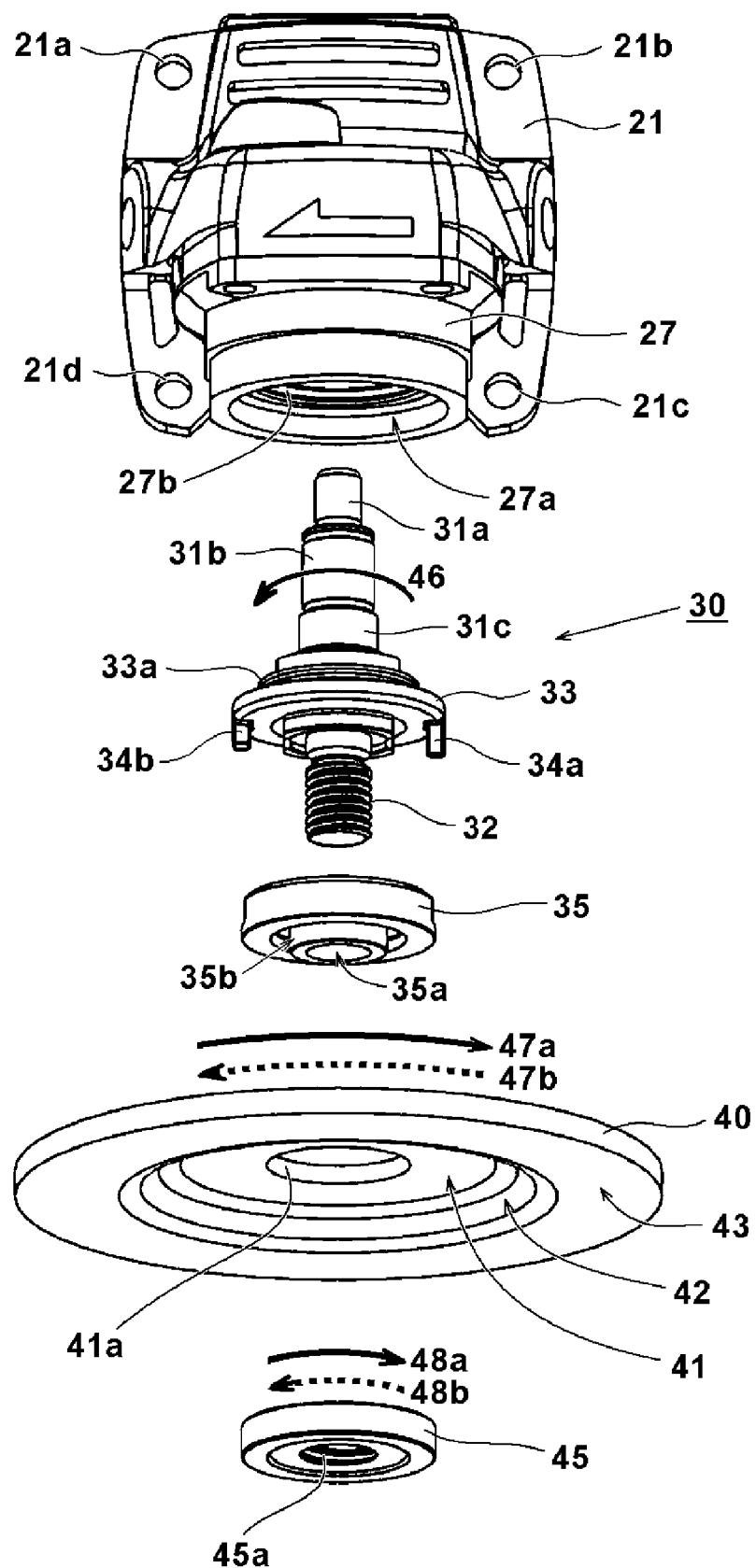
FIG. 3 is a developed perspective view showing an attachment structure for attaching a grindstone 40 to a spindle 30 in FIG. 2.

FIG. 3 is a developed perspective view showing an attachment structure for attaching the grindstone 40 to a spindle 30. The gear case 21 is made of metal and accommodates the power transmission mechanism that transmits a rotating force of the motor 5 to the spindle 30 which is an output shaft. Four screw bores 21a to 21d are formed in the gear case 21, and the gear case 21 is fixed to the motor housing 2 by screws not shown. In the spindle 30, a small-diameter portion 31a in which an upper end region is rotatably supported by the metal 25 (refer to FIG. 2) is formed, a main shaft portion 31b which fixes the bevel gear 23 is formed under the small-diameter portion 31a, and a bearing holding portion 31c for fixing the bearing 26 is formed in a lower region of the main shaft portion 31b. A male screw 32 for fixing the washer nut 45 is formed at a lower end region of the spindle 30. The male screw 32 is a positive screw that is fastened when the washer nut 45 is rotated in a direction of an arrow 48a and is loosened when the washer nut 45 is rotated in a direction of an arrow 48b. The spindle cover 27 is arranged in the vicinity of a center of the main shaft portion 31b of the spindle 30. The spindle cover 27 is a fixing member for rotatably supporting the bearing 26. In the spindle cover 27, an opening portion 27a is formed at a lower side, and an inner circumferential side of the opening portion 27a becomes a labyrinth portion 27b.

The upper end side of the spindle 30 is rotatably supported by a metal 25 in the gear case 21, and the vicinity of the center of the spindle 30 is rotatably supported by the bearing 26 (refer to FIG. 2) made of a ball bearing. The support body 33 is arranged in the bearing 26. The support body 33 has a width across flat and is connected not to rotate relatively to the spindle 30, and the support body rotates together with the spindle 30. A labyrinth portion 33a is formed at an upper side of the support body 33. The labyrinth portion 33a forms a close narrow space in cooperation with the labyrinth portion 27b of the spindle cover 27, thereby preventing dust or the like from entering the gear case 21. A disk-shaped region is formed in the vicinity of a center of the support body 33, and protruding portions 34a and 34b for preventing rotation from being stopped are formed, the protruding portions extending from two positions of an outer edge of the disk-shaped region in a direction parallel to a direction of the axial line B1. The protruding portions 34a and 34b are fitted into bore portions formed in the wheel washer 35. The wheel washer 35 is a metal member having a through-hole 35a that the male screw 32 penetrates, the through-hole being positioned at a center of the wheel washer. The wheel washer 35 holds one surface (surface at a convex side) of the grindstone 40 to be mounted and has a cylindrical portion 35b positioned in a through-hole 41a of the grindstone 40. In the grindstone 40, a projecting portion 41 in which the vicinity of a center is offset is formed, the through-hole 41a that the circular cylindrical portion 35b penetrates is formed at a center of the projecting portion 41, and the grindstone 40 can be accurately positioned to be concentric with the spindle 30. A work surface 43 capable of being used for grinding is formed in an outer region of the grindstone 40 in a radial direction, and a connection surface 42 formed on an inclined surface is formed between the work surface 43 and the projecting portion 41. The washer nut 45 is a fixing member for fixing the grindstone 40 to the spindle 30 by fastening the grindstone 40 in the axial direction and has a female screw 45a formed at a center thereof. A spindle locking mechanism (not shown) that inhibits rotation of the spindle 30 is operated during fastening of the washer nut 45 so that the washer nut is fastened using a dedicated fastening tool (not shown).

A rotational direction of the spindle 30 when the switch lever 11 of the rotary tool 1 is turned on is a direction of an arrow 46, and the grindstone 40 also starts rotating corresponding to the start of the motor 5. As a reaction force toward the direction of the arrow 46 of the spindle 30, a force which causes relative rotation in a direction of an arrow 47a acts on the stopped grindstone 40 at the time of the start. In this case, a force in the same direction of the arrow 48a also acts on the washer nut 45 which is a fixture fixing the grindstone 40. The forces in the directions of the arrows 47a and 48a act in a very short time when the spindle 30 starts to accelerate; however, a rotational direction of the arrow 48a in the washer nut 45 acts in a direction in which the washer nut 45 is fastened, and thus the washer nut 45 is fastened when the motor 5 is started. Conversely, in a case that a strong braking force of an electric brake or the like is applied to the motor 5 performing constant-speed rotation, when the spindle 30 starts to decelerate, a rotating force which causes relative rotation in the direction of an arrow 47b acts on the grindstone 40 due to inertia of the grindstone 40. The rotating force along the arrow 47b also acts as a rotating force along the arrow 48b on the washer nut 45. Therefore, when the electric brake is rapidly applied, loosening torque acts on the washer nut 45 at the moment when the electric brake is applied, and there is a concern that the washer nut 45 is slightly loosened. Therefore, in the example, relative rotating forces applied along the arrows 47a and 48a at the time of start are reliably applied so that fastening torque is applied, and thereby the washer nut 45 is sufficiently fastened to the spindle 30, and the washer nut 45 is not loosened during braking.

Further, determination of a state in which acceleration is not sufficiently completed during the start, that is, a state in which a brake is applied before a fastening force in the direction of the arrow 48a is sufficiently applied, is performed, and a loosening force along the arrow 48b is not to be larger than the fastening force along the arrow 48a during a series of operations from acceleration to the stop of the motor due to pulling a trigger once. By maintaining a relationship of (total fastening torque amount along the arrow 48a)≥(total loosening torque amount along the arrow 48a) in this way, loosening of the fixture (washer nut 45) fixing a tip tool when a brake is applied can be avoided.

Figure 4:
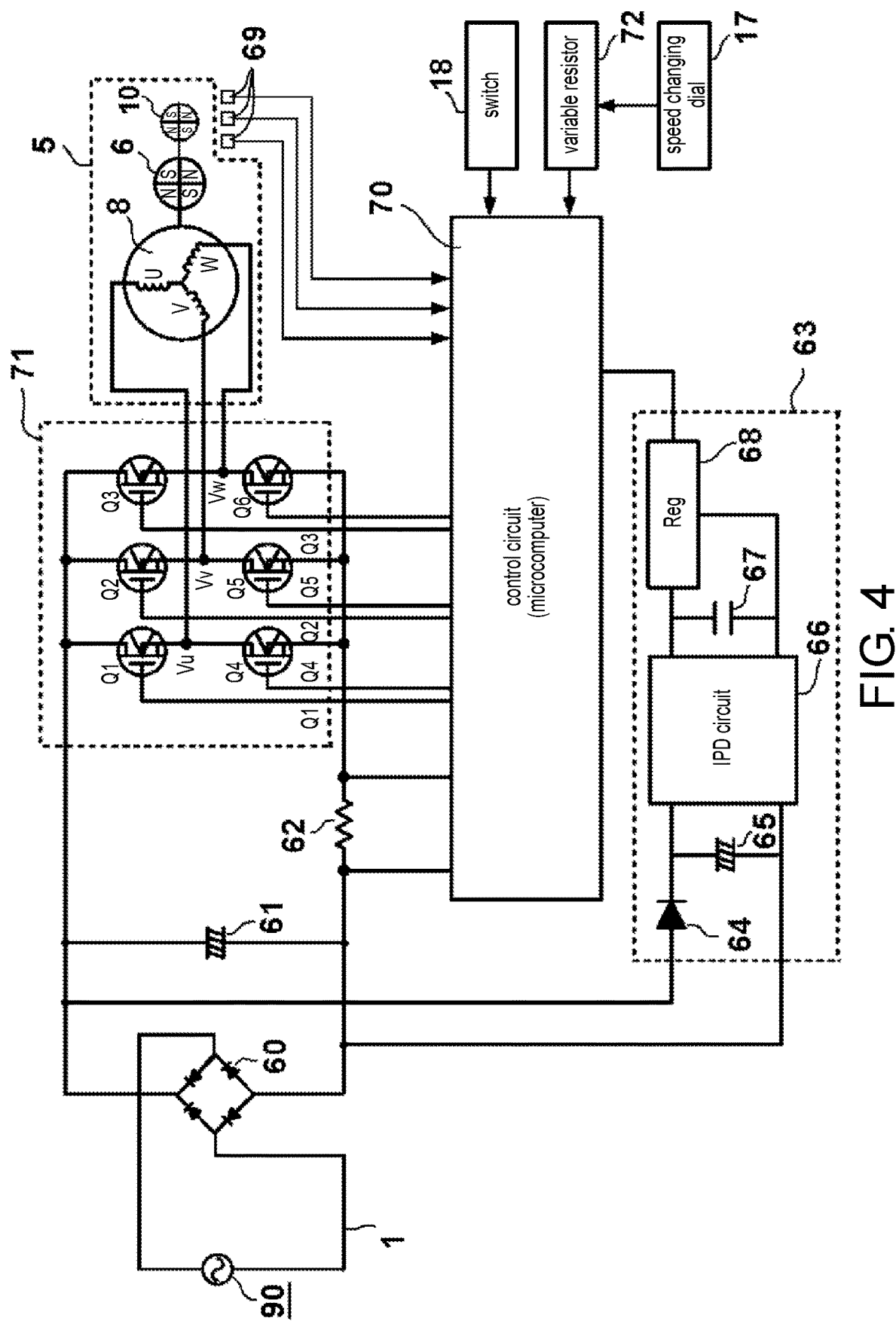
FIG. 4 is a block diagram showing a circuit configuration of a driving control system of a motor 5 in FIG. 1.

Next, a circuit configuration of a driving control system of the motor 5 is described with reference to FIG. 4. An alternating current which is input by the power cord 19 and is supplied from an AC power supply 90 is rectified by a diode bridge 60 and is input to an inverter circuit 71. A smoothing capacitor 61 is arranged downstream of the diode bridge 60. Only one capacitor 61 is shown in FIG. 4; however, a plurality of capacitors may be arranged, or a capacitor may also be arranged at an input side of the diode bridge 60. In addition, not only the capacitor 61 but also a choke coil or the like may be added. The inverter circuit 71 is configured to include the six switching elements Q1 to Q6, and a switching operation is controlled by gate signals H1 to H6 which are supplied from the control circuit 70. Large output transistors such as a field-effect transistor (FET) or an insulated-gate bipolar transistor (IGBT) are used as the switching elements Q1 to Q6. Drain terminals of the switching elements Q1 to Q3 are commonly connected to a positive pole side of the diode bridge 60. In addition, drain terminals of the switching elements Q4 to Q6 are connected to the source terminals of the switching elements Q1 to Q3 and V-phase, U-phase, and W-phase terminals of the motor, respectively. Source terminals of the switching elements Q4 to Q6 are commonly connected to a negative pole side of the diode bridge 60. The rotor 6 having the permanent magnet 7 rotates in the stator 8 of the motor 5. The position detecting sensor magnet 10 is connected to the rotary shaft 9 of the rotor, a position of the sensor magnet 10 is detected by the rotational-position detecting element 69 such as the hole IC, and thereby the control circuit 70 detects a rotational position of the motor 5.

A constant-voltage power circuit 63 is further connected to an output side of the diode bridge 60. The constant-voltage power circuit 63 is a power circuit for supplying a direct current at a stabilized reference voltage (low voltage) to the control circuit 70. The constant-voltage power circuit 63 is configured to include a diode 64, a smoothing electrolytic capacitor 65, an IPD circuit 66, a capacitor 67, and a regulator 68.

The control circuit 70 is a control unit for performing the start, stop, and rotation speed control of the motor 5 and is configured to include a microcomputer (hereinafter, referred to as microcomputer). The control circuit 70 controls the rotation speed of the motor 5 and controls an energizing time and drive voltage to the coils U, V, and W based on a start signal which is input accompanying an operation of the switch 18 and a signal of a variable resistor 72 which is set by a speed changing dial 17. The control circuit 70 is connected to gates of the six switching elements Q1 to Q6 of the inverter circuit 71 and supplies the drive signals H1 to H6 for turning on and off the switching elements Q1 to Q6.

The control circuit 70 detects the rotational position of the rotor 6 by the rotational-position detecting element 69 configured of the hole IC and outputs the drive signals H1 to H6 to the plurality of switching elements Q1 to Q6 so as to perform a switching operation, and thereby the inverter circuit 71 supplies, to the motor 5, direct current voltage output from the diode bridge 60 as three-phase (U phase, V phase, and W phase) voltages Vu, Vv, and Vw. Voltages at both ends of a current detecting shunt resistor 62 connected between the diode bridge 60 and the inverter circuit 71 are measured, and thereby a magnitude of the current supplied to the motor 5 is detected by the control circuit 70. In this manner, electric drive power is sequentially supplied to a predetermined coil of the motor 5 by using the inverter circuit 71, and thereby a rotating magnetic field is formed to rotate the motor 5.

Figure 5:
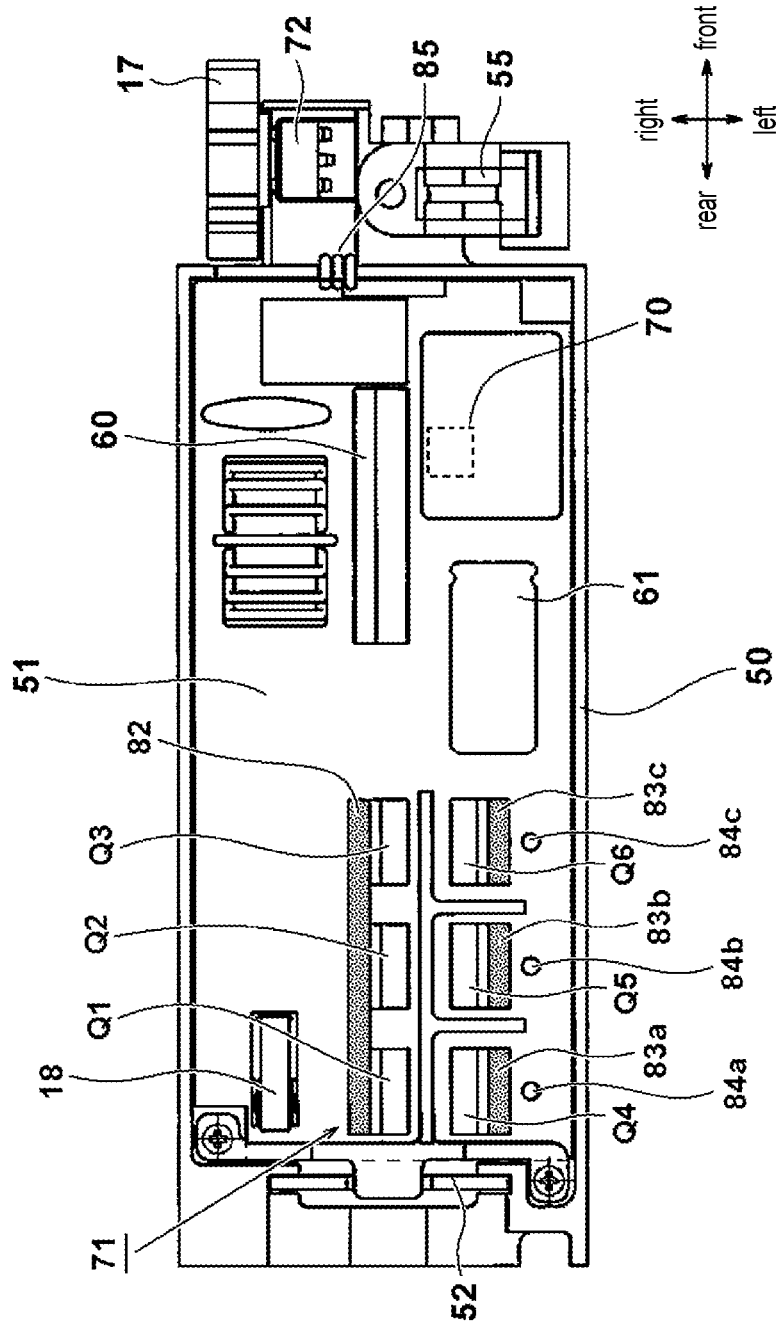
FIG. 5 is an arrow view when a case 50 is viewed from an arrow A direction in FIG. 2.

FIG. 5 is an arrow view when an interior of the case 50 is viewed from a direction of an arrow A in FIG. 2 and a view showing an installation state of the switching elements Q1 to Q6 at the circuit board 51. The circuit board 51 accommodated inside the case 50 has a shape which is substantially the same as an internal shape of the case 50 and is immersed in the resin 56 (refer to FIG. 2) hardened from a liquid. Members installed at the circuit board 51 mainly includes a rectification circuit such as the diode bridge 60 or the like, the inverter circuit 71 including the six switching elements Q1 to Q6, a microcomputer which configures the control circuit 70, the constant-voltage power circuit 63 (not shown), and the like. The power cord 19 not shown (refer to FIG. 2) is connected to an input side of the circuit board 51 from the outside of the rotary tool 1, and a commercial AC is input to the diode bridge 60. The power cord 19 not shown is fixed by a power cord holding portion 55. An output side of the circuit board 51 is connected, by three lead wires not shown, to terminals 84a to 84c which are the V phase, the U phase, and the W phase of the coils of the motor 5).

In the circuit board 51, the switching elements Q1 to Q3 and the switching elements Q4 to Q6 are respectively disposed to be aligned by three in the axial direction. The switching elements Q1 to Q6 are obtained by extending three metal terminals from a lower side of a package, and a heat sink made of metal is arranged at a back side of the package. A common metal plate 82 for heat dissipation is further arranged at the switching elements Q1 to Q3. The rest three switching elements Q4 to Q6 are disposed to be aligned in a line, and separated metal plates 83a to 83c are arranged as the heat sinks on the backside.

At a front side of the circuit board 51, the sensor board 52, on which the three rotational-position detecting elements 69 (refer to FIG. 2) are installed, is disposed to be orthogonal to the circuit board 51. At a rear side of the circuit board 51, the switch 18 which is operated in conjunction with the switch lever 11 is installed. The variable resistor 72 is arranged at a rear side of the case 50. The speed changing dial 17 is arranged at a rotary shaft of the variable resistor 72, the speed changing dial 17 is arranged to expose a part from an opening region (not shown) of the rear cover 3, and an operator can perform a rotating operation on the speed changing dial 17. The circuit board 51 and the variable resistor 72 are wired via a lead wire 85.

Figure 6:
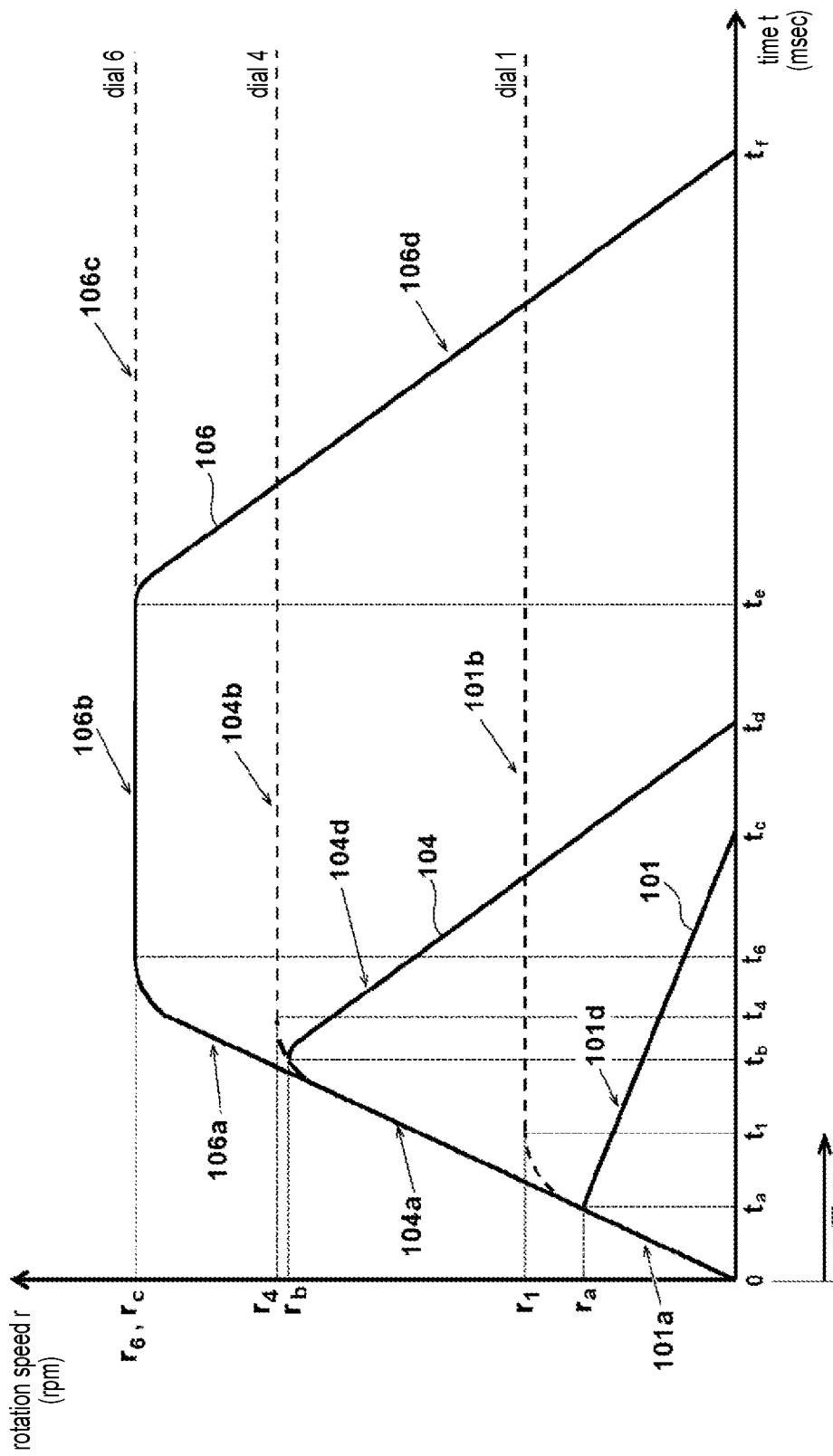
FIG. 6 is a graph showing an example of a change in rotation speed from the start to the stop of the spindle 30.

Next, an example of rotation speeds from the start to the stop of the spindle 30 is described with reference to FIG. 6. In FIG. 6, the horizontal axis represents time (unit: second), and a vertical axis represents a rotation speed r (unit: rpm) of the motor 5. In the rotary tool 1 of the example, it is possible to set six levels of speeds as the rotation speed of the motor when the switch lever 11 is turned on. Here, as a speed curve representing a relationship between the time and the rotation speed, examples of a rotation speed 101 of the spindle 30 when dial 1 is selected, a rotation speed 104 when dial 4 is selected, and a rotation speed 106 when dial 6 is selected are shown. When dial 6 is selected, a rotation speed $r_6$ is 27,000 rpm. When the operator turns on the switch lever 11 at a time point 0, the motor 5 is started, rotation of the motor 5 is accelerated as shown by arrows 101a, 104a, and 106a, and the rotation speed reaches a predetermined rotation speed $r_6$ as shown by an arrow 106b so that the rotation proceeds to a constant-speed rotation. When the constant-speed rotation continues in this state, the constant-speed rotation is maintained as shown by an arrow 106c representing a dotted line. Here, when the operator turns off the switch lever 11 at a time point $t_e$ during the constant-speed rotation, the control circuit 70 activates the electric brake by causing a short circuit between the phases of the coils of the motor 5. Then, a strong braking force is applied to the rotary shaft 9 of the motor 5. Therefore, the rotation speed of the spindle 30 rapidly decreases as shown by an arrow 106d, and the spindle 30 and the grindstone 40 mounted on the spindle 30 are stopped at a time point $t_f$. Moreover, the time from the time point $t_e$ to the time point to is about one second for example. For comparison, about eight seconds are taken to reach the stop only by inertia from about the rotation speed $r_6$ (=27,000 rpm) without the electric brake; however, a rapid stop is achieved when the electric brake is used concurrently.

When dial 4 is selected, a rotation speed $r_4$ of the spindle 30 is 22,000 rpm. When the switch lever 11 is turned on at the time point 0, the motor 5 is started and is accelerated as shown by the arrows 101a and 104a, the rotation speed reaches the rotation speed $r_4$ at a time point $t_4$ in an ON state of the switch lever 11 in this state, and the constant-speed rotation is performed as shown by a dotted line represented by an arrow 104b. Here, when the operator turns off the switch lever 11 at a time point $t_b$ ($>t_1$) at which the rotation reaches the constant-speed rotation, the electric brake is activated. Hence, the rotation speed 104 is decelerated as shown by an arrow 104d, and the grindstone 40 is stopped at a time point $t_d$.

When dial 1 is selected, a rotation speed $r_1$ set as a target is 9,600 rpm. When the switch lever 11 is turned on at the time point 0, the motor 5 is started and is accelerated as shown by the arrow 101a, the rotation speed reaches the rotation speed $r_1$ at a time point $t_1$ in an ON state of the switch lever 11 in this state, and the constant-speed rotation is performed as shown the arrow 101b. Here, when the operator turns off the switch lever 11 at a time point $t_a$ ($\le t_1$) before the rotation reaches the constant-speed rotation, the electric brake is not activated. Hence, the rotation speed of the spindle 30 is decelerated due to inertia, and the grindstone 40 is stopped at a time point $t_e$ as shown by an arrow 101d. In the example, since the switch is turned off before the motor 5 serving as a driving source is started and comes into a required rotation state, that is, a time T elapses, the electric brake is not to be applied. Here, a threshold used to determine whether the motor reaches the required rotation state is determined by an elapsed time after the switch lever 11 is turned on, and a limitation is made so that the electric brake is not performed until the time T equal to a period between the time points 0 to $t_1$ elapses. Moreover, the reason for limiting the application of the brake until the time T elapses is that the washer nut 45 will not be loosened during braking. Hence, the brake may not be applied at all; however, the brake may be applied so that a braking force is sufficiently weak.

As described above, in the example, before the washer nut 45 is sufficiently rotated in the fastening direction (direction of the arrow 48a in FIG. 3) when the motor 5 is started, the brake is not applied. Accordingly, a fastening amount of the washer nut 45 during the start is larger than a loosening amount of the washer nut 45 during deceleration, and thus a phenomenon of loosening the grindstone 40 can be avoid.

Figure 7:
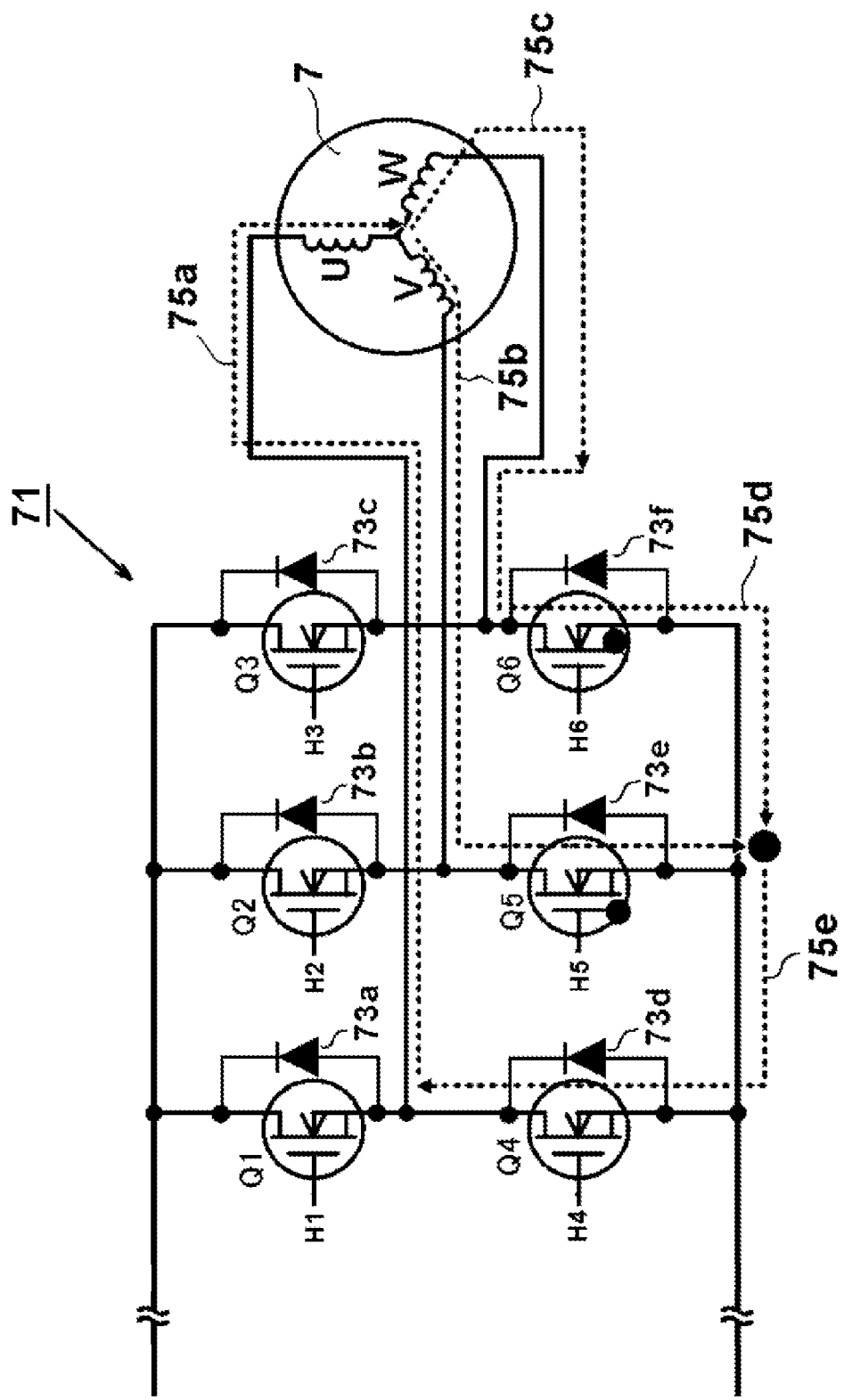
FIG. 7 is a circuit diagram for illustrating an operation of an electric brake when a brake to the spindle 30 is applied.

Next, principles of the electric brake are described with reference to FIG. 7. FIG. 7 is an enlarged diagram of the inverter circuit 71 using the switching elements Q1 to Q6. Here, flyback diodes 73a to 73f included in the respective switching elements Q1 to Q6 are also shown. When the electric brake is applied, the control circuit 70 turns on the gate signals of the switching elements Q4 to Q6 at a side of a lower arm, thereby causing a short circuit between sources and drains of the switching elements Q4 to Q6. In this short-circuit state, short-circuit currents of arrows 75a to 75e flow, due to a counter electromotive force of the motor, to the V to W phase, respectively, and a braking force is generated. In addition, currents flow to the U to V phases in directions of 75a, 75b, and 75e represented by dotted lines, and the short-circuit currents of 75a, 75c, and 75e flow to the U to W phases. In this case, the current 75e passing through the switching element Q4 is a current in an inverse direction from a direction during a common driving operation; however, the current 75e flows through the flyback diode 73d arranged in the switching element Q4, and thereby the switching element Q4 is prevented from being damaged. Similarly, the currents 75b and 75d also flow through the flyback diodes 73e and 73f arranged in the switching elements Q5 and Q6. When the gate signals of the switching elements Q4 to Q6 are turned off, the short-circuit state of the U to W phases are cancelled. Hence, when the electric brake is applied, the control circuit 70 controls the number of gates of the switching elements Q4 to Q6 which are turned on or performs PWM control of turning on and off the gate signals, thereby adjusting the braking force of the electric brake.

Figure 8:
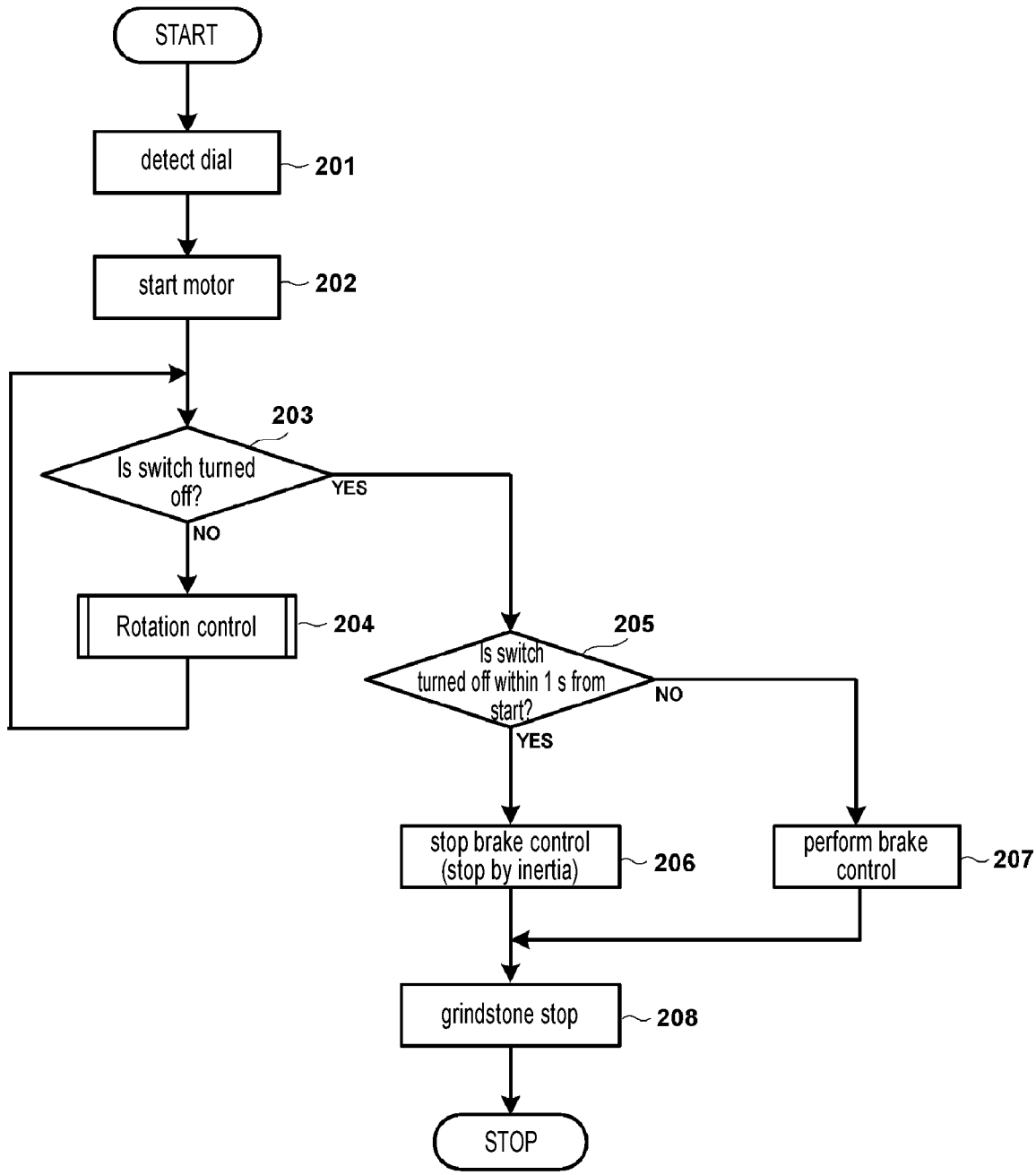
FIG. 8 is a flowchart showing a brake control procedure when a switch is turned off.

FIG. 8 is a flowchart showing control during the start of the rotary tool. A series of procedures shown in FIG. 8 can be executed by software of a program which is stored in the control circuit 70 in advance. The operator slides the switch lever 11 toward the front side to turn on the switch lever, and thereby starting the motor 5. When the switch lever 11 is turned on, the control circuit 70 detects a set value of the speed changing dial 17 (refer to FIG. 5) and starts and accelerates the motor 5 so that the rotation of the motor 5 reaches a set rotation speed (steps 201 and 202). Next, the control circuit 70 determines whether the switch lever 11 is turned off (step 203). When the switch lever is maintained in an on state, acceleration of the motor and control of a constant-speed operation at the set rotation speed are performed by the microcomputer, and the same process back in step 203 is executed (step 204). Rotation control of the motor 5 in step 204 is the same as a conventional rotation control method of a motor in a grinder, and thus detailed description is omitted.

When the switch lever 11 is turned off in step 203, the control circuit 70 determines whether or not an elapsed time from the turning on of the switch lever 11 to the turning off of the switch lever 11 reaches the predetermined time T (=one second) (step 205). When a time interval is longer than one second in step 205, the control circuit 70 causes short circuit in the plurality of switching elements of the inverter circuit 71 and performs brake control that causes short circuit between the coils of the phases of the motor 5, thereby rapidly stopping the motor 5 (step 207). When the time interval is one second or shorter in step 205, the control circuit 70 stops the grindstone 40 by inertia without applying a so-called electric brake using the inverter circuit 71 (step 206). Moreover, the elapsed time T being the threshold is set in advance based on an experiment or the like at the time of design development and may be recorded in the microcomputer. In addition, the threshold used to determine whether or not to apply the electric brake is not limited only to the elapsed time T and may be a threshold using the rotation speed r. In this case, a configuration may be employed, in which the electric brake is not applied until the rotation speed r during the acceleration reaches a predetermined threshold, and the electric brake is applied when the rotation speed reaches a predetermined rotation speed r. Further, a configuration may be employed, in which detection is performed by using a measured value of a current detected using the shunt resistor 62, as a threshold used to determine whether or not to apply the electric brake, so that the electric brake is applied after the start current temporarily increased during the start is decreased to a predetermined value. When the grindstone 40 is stopped in step 208, the control based on the flowchart is stopped.

In the example described in FIGS. 6 to 8, the elapsed time T is used to determine a "required rotation elapse" state indicating whether or not to apply the electric brake and the time is set to one second; however, which state described in FIG. 6 is used as the "required rotation elapse" state for determining avoidance of application of the electric brake may be appropriately set depending on characteristics of the motor, the deceleration mechanism, a rotation mechanism or the like to be used or a type of grindstone.

Figure 9:
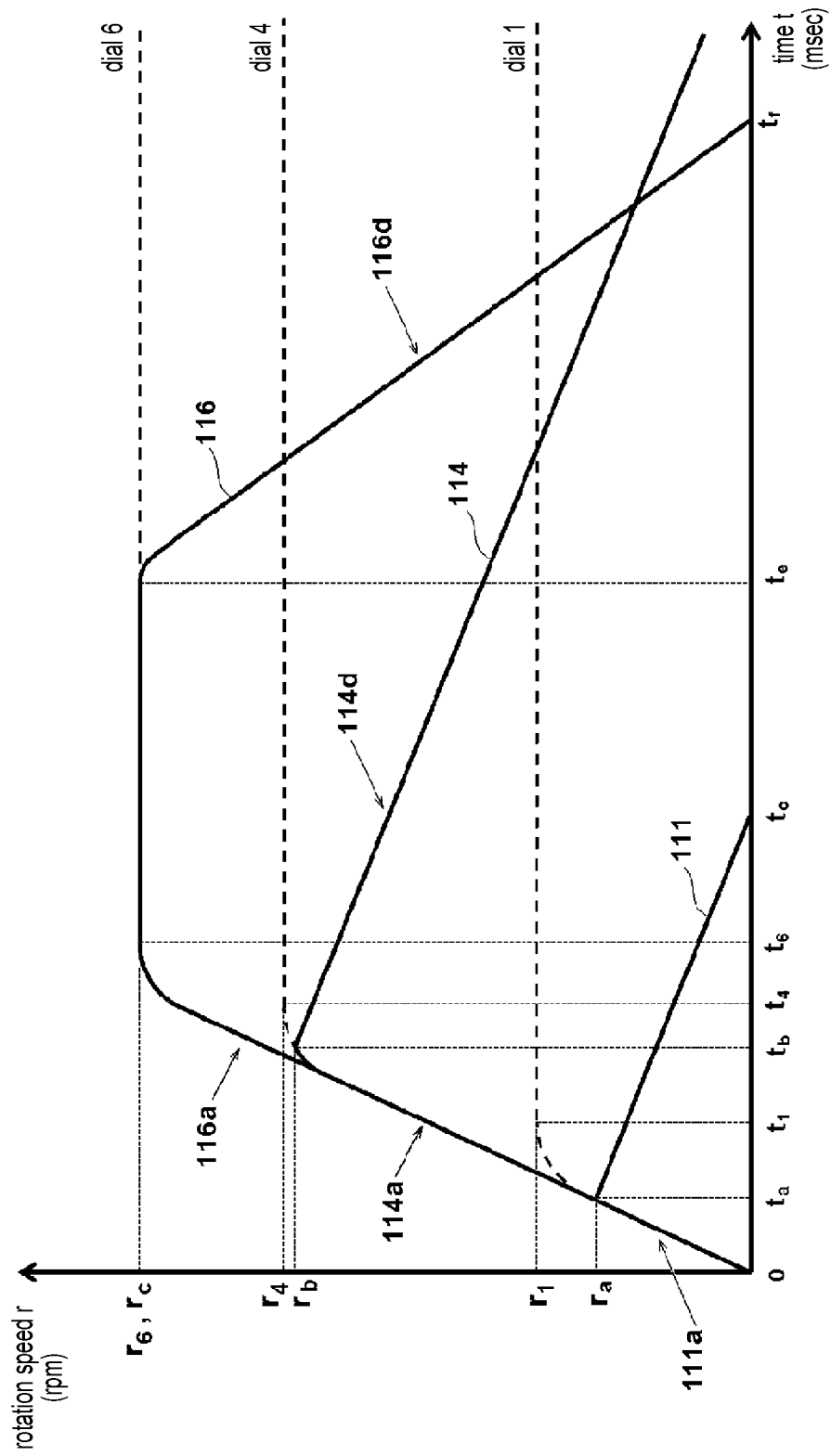
FIG. 9 is a graph showing an example of a change in rotation speed from the start to the stop of the spindle 30 (second part).

Next, an example in which another value is used as a threshold used to determine whether or not to apply the electric brake is described with reference to FIG. 9. In FIG. 9, whether the rotation speed reaches the set rotation speed $r_6$ of the highest rotation speed (here, dial 6) by the speed changing dial 17 is used as a threshold used to determine the required rotation elapse state. After the rotation speed reaches the set rotation speed $r_6$, the control circuit 70 can easily performs the detection based on a positional signal detected by the rotational-position detecting element 69 such as the hole IC.

In FIG. 9, the switch lever 11 is turned on at the time point 0 when dial 6 is selected, and a rotation speed 116 increases as shown by arrows 111a, 114a, and 116a and reaches the rotation speed "$r_6$" serving as a threshold to determine whether or not to apply the electric brake. After this state, when the switch lever 11 is turned off at the time point $t_e$, the electric brake is applied, the speed decreases rapidly as shown by an arrow 116d, and the grindstone 40 is stopped at the time point $t_f$. When dial 4 is selected, the rotation speed $r_4$ of the constant-speed rotation is 22,000 rpm. When the operator turns on the switch lever 11 at the time point 0, the motor 5 is started, and rotation of the motor is accelerated as shown by the arrows 111a and 114a. In this case, since the rotation speed does not reach the rotation speed $r_6$ being the threshold even when the operator turns off the switch lever 11 at the time point $t_b$, the grindstone 40 is stopped by inertia without applying the electric brake, as shown by an arrow 114d. Similarly, when the switch lever 11 is turned off at the time point $t_a$ in a case of dial 1, the grindstone 40 is stopped by inertia without applying the electric brake. The threshold rotation speed used to determine whether or not to apply the electric brake is set to $r_6$ as shown in FIG. 9; however, when this setting is performed, the electric brake does not come into an operating state when dials 1 to 5 are selected. Therefore, an appropriate threshold may be set within a range of $r_a$ to $r_6$ in practice. Further, as in Example 2 described below, a configuration may be employed in which after the rotation speed is increased to the threshold rotation speed $r_6$ once during the start of dials 1 to 5, the rotation speed is decreased to a set speed. Moreover, Example 1 employs the configuration in which, when the switch lever 11 is turned off before the required rotation elapse, the grindstone 40 is stopped by inertia without applying the electric brake; however, when the switch lever 11 is turned off before the required rotation elapse, the electric brake is applied by a braking force weaker than that of the electric brake which is applied after the required rotation elapse, and thereby a loosening force applied to the washer nut 45 may be weakened.

Example 2

Figure 10:
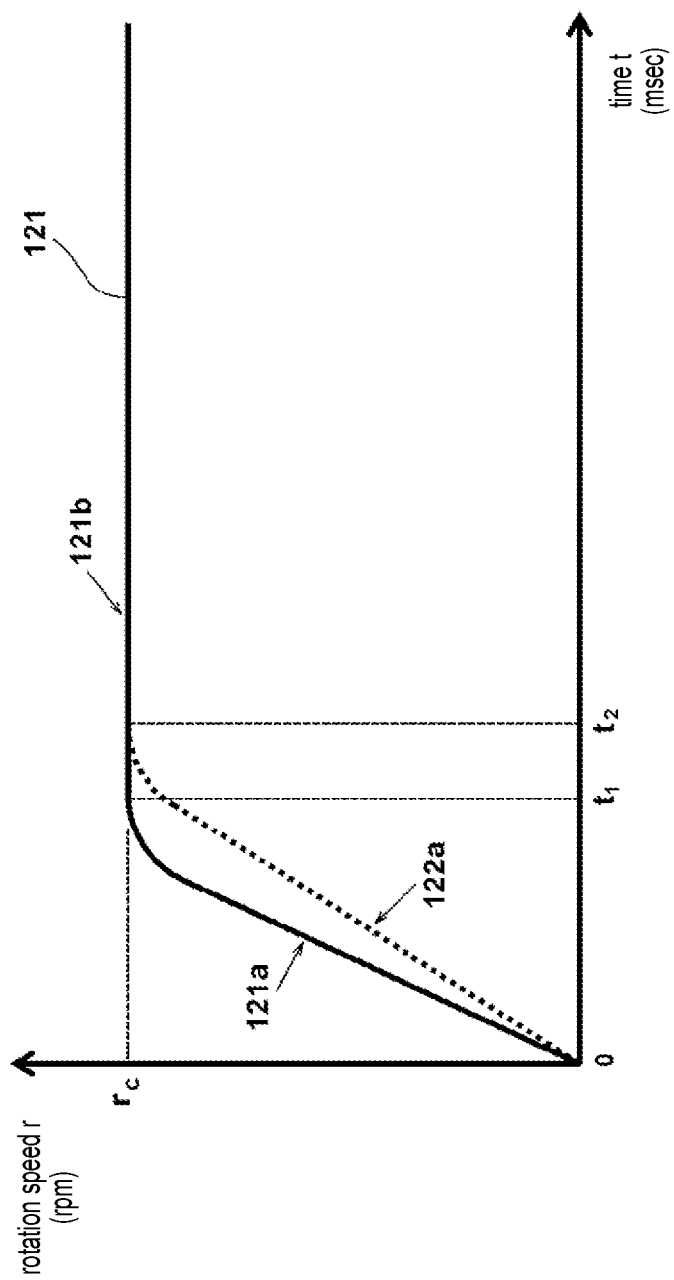
FIG. 10 is a graph showing an acceleration state during the start due to a difference in inertia of the grindstone.

Next, a second example of the invention of the present application is described with reference to FIGS. 10 to 13. In the second example, the fixture is prevented from being loosened during the start, and thus tightness of the fixture in a direction of the arrow 48a in FIG. 3 during the start is increased, in addition to preventing the loosening when the brake is applied. FIG. 10 is a graph showing a difference in acceleration of the spindle 30 depending on a difference of the grindstone 40. When the grindstone 40 attached to the spindle 30 is the lightest and has low inertia, the rotation speed is increased by high acceleration as shown by an arrow 121a, and the grindstone is rotated at a constant speed of a speed $r_c$ set by the speed changing dial 17 (refer to FIG. 5) as shown by an arrow 12/ b. On the other hand, when the grindstone 40 that can be mounted is the heaviest and has high inertia, the rotation speed is increased by low acceleration as shown by a dotted line represented by an arrow 122a, and the grindstone is rotated at the speed $r_c$ shown by an arrow 121b. In other words, a required acceleration time varies depending on the type of the grindstone 40 so that the time taken for acceleration is set to $t_1$ when the grindstone having low inertia is arranged, and the time taken for acceleration is set to $t_2$ when the grindstone having high inertia is arranged. However, in the example, no matter which grindstone 40 is used, the washer nut 45 is prevented from being loosened by control performed during the acceleration.

Figure 11:
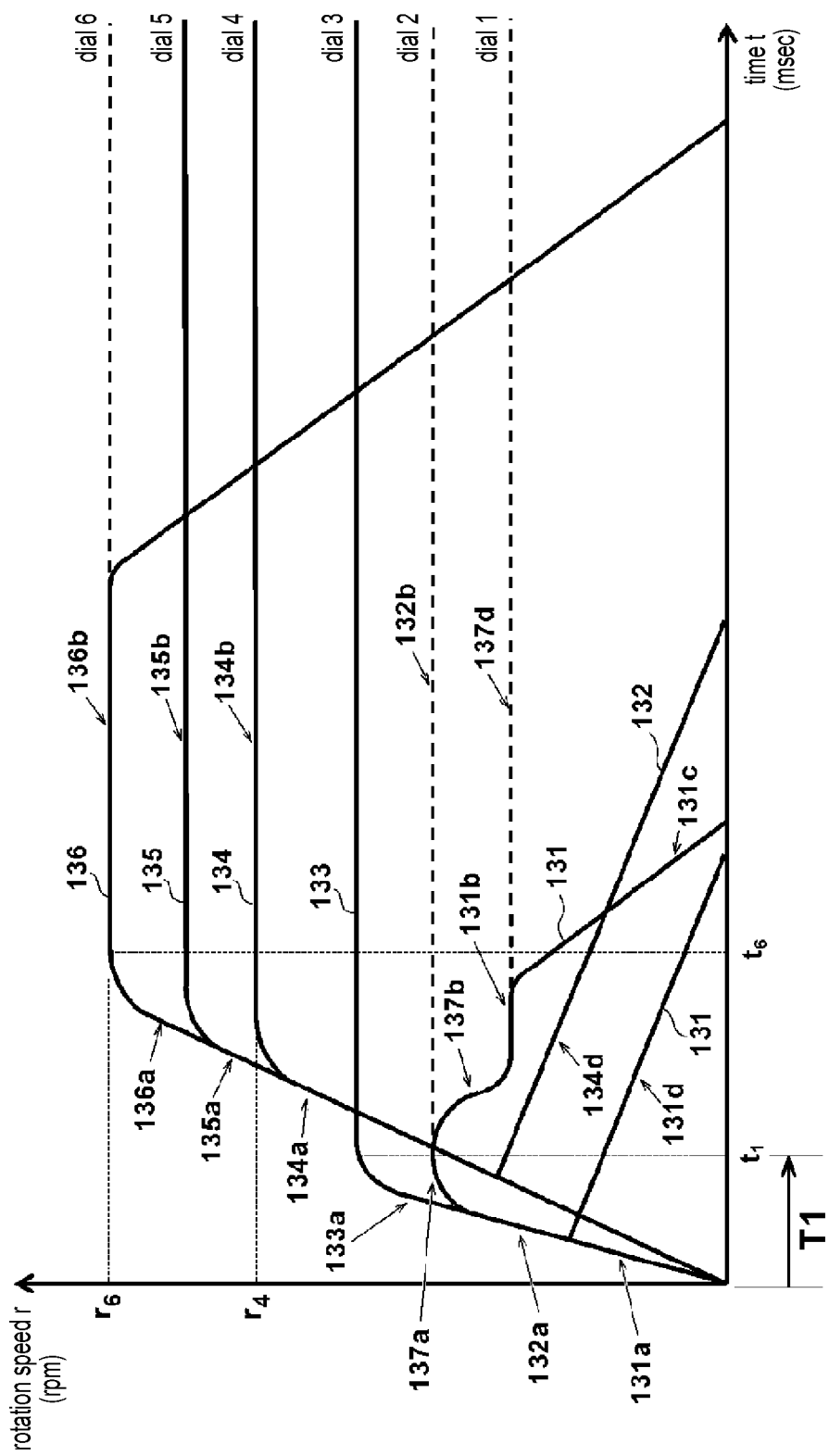
FIG. 11 is a graph for illustrating acceleration control in a second example and shows an acceleration curve and a deceleration curve for each set speed determined by a speed changing dial 17.

FIG. 11 is a graph for illustrating acceleration control according to the second example and shows an acceleration curve and a deceleration curve for each set speed determined by the speed changing dial 17. In the example, soft start control of performing acceleration by gradually increasing duty (ratio) of PWM control during the acceleration is performed. In the example, acceleration when a set value of the speed changing dial 17 is 1 to 3 is made higher than conventional acceleration. When dials 4 to 6 are selected, the acceleration is performed in accordance with an acceleration curve as before as shown by arrows 134a, 135a, and 136a, and the rotation speed reaches a speed set as shown by arrows 134b, 135b, and 136b. In conventional acceleration control, the acceleration was performed to have the same inclination as that of the acceleration curves represented by the arrows 134a, 135a, and 136a in a state that dials 1 to 3 were selected. However, in the example, when a low speed at which a fastening level of the washer nut 45 during the start is not sufficiently high is set, that is, when dials 1 to 3 are selected, the acceleration is increased as shown by arrows 131a, 132a, and 133a, and thereby a fastening force which is applied to the washer nut 45 during the acceleration is increased. Further, when dial 1 indicating that the fastening level of the washer nut 45 was most insufficient during the start is selected, a rotation speed 131 is increased once to a set rotation speed by dial 2 as shown by an arrow 137a, and then the rotation speed is decreased as shown by an arrow 137b so as to reach a constant speed state as shown by an arrow 131b. Specifically, control of performing slow deceleration from $t_1$, then, rapid deceleration, and slow deceleration again immediately before the rotation speed reaches the rotation speed of the arrow 131b (drawing a cubic curve) is performed. By performing the slow deceleration from $t_1$, it is possible to preferably prevent the washer nut 45 from being loosened due to the inertia of the grindstone 40 when the rotation speed is switched from acceleration to deceleration, and the rotation speed can rapidly reach a target rotation speed because a deceleration rate is increased in the middle of a curve represented by the arrow 137b. When dial 2 is selected, the control is performed so that the acceleration is performed as shown by the arrows 131a and 132a and the rotation speed reaches the set rotation speed without deceleration as shown by the arrow 137a to an arrow 132b.

In FIG. 11, the threshold used to determine whether or not to perform braking of the electric brake is determined depending on whether or not the time of rotation reaches the time point $t_1$ similarly to Example 1, that is, whether or not a time T1 elapses. Hence, when the switch lever 11 is turned off during the acceleration as shown by the arrow 131a in a case that dial 1 is set, the spindle is stopped by inertia without applying the electric brake as shown by an arrow 131d. Similarly, on a curve of a rotation speed 134 of dial 4, when the switch lever 11 is turned off before the time reaches the time point $t_1$ during the acceleration, the spindle is stopped by inertia without applying the electric brake as shown by an arrow 134d. On the other hand, when the switch lever 11 is turned off during the constant-speed rotation as shown by the arrow 131b in the case of dial 1, the switch lever is turned off after the time reaches the time point $t_1$ of the threshold, and thus the spindle 30 is rapidly stopped as shown by an arrow 131c by applying the electric brake.

Figure 12:
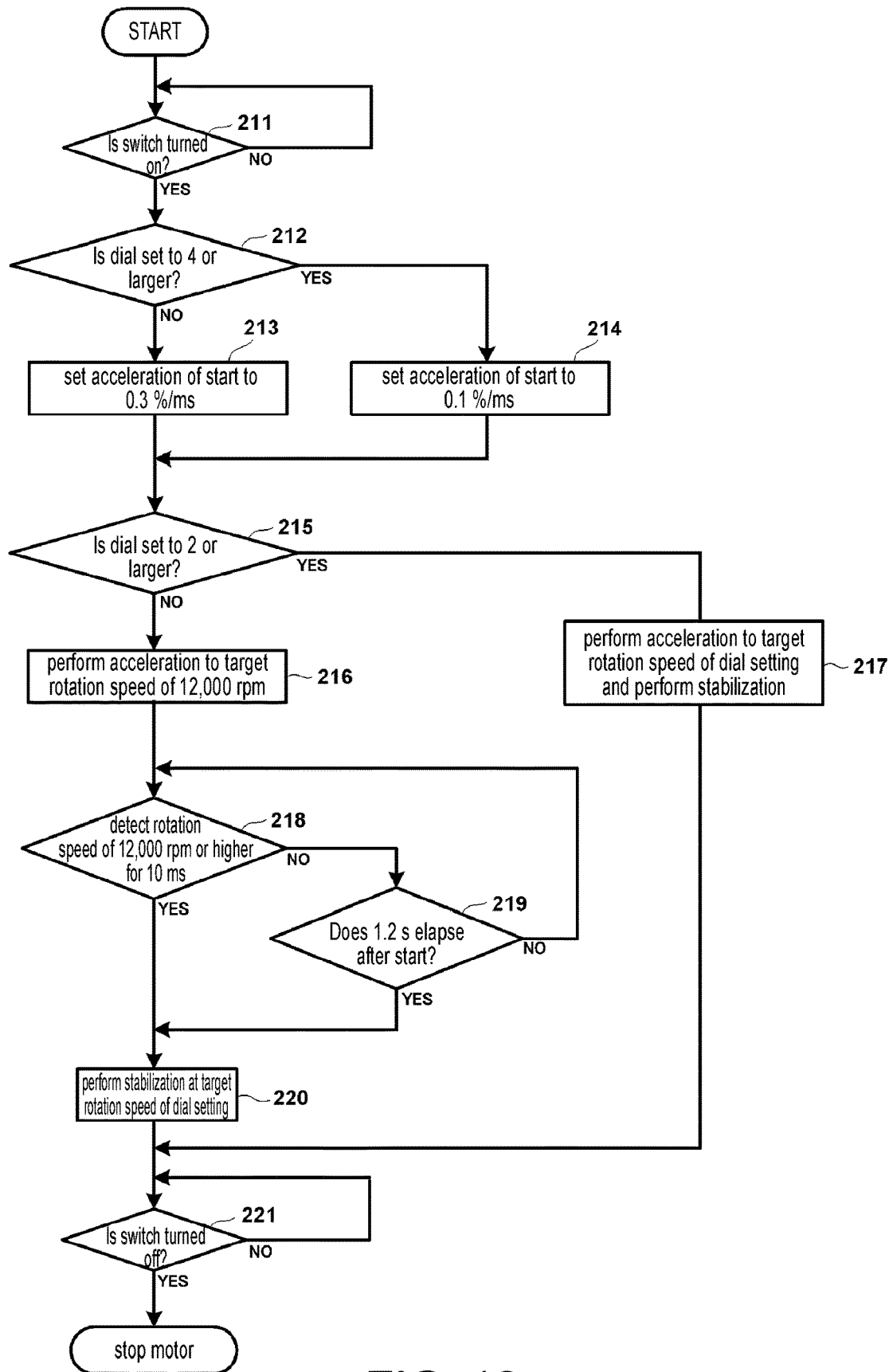
FIG. 12 is a flowchart showing an acceleration control procedure of a motor when a switch is turned on in the second example.

Next, a procedure of the acceleration control described in FIG. 11 is described with reference to a flowchart in FIG. 12. The flowchart in FIG. 12 is executed in a period from the stop of the motor 5 to the time when the motor is accelerated to be operated under constant-speed control. First, whether or not the switch lever 11 comes into the ON state is determined. When the switch lever is in an OFF state, the switch lever maintains the standby state (step 211). When the switch lever 11 is turned on, the control circuit 70 determines whether the set value of the speed changing dial 17 is 4 or larger (step 212). When the set value of the speed changing dial 17 is smaller than 4, that is, when the set value is 1 to 3, the control circuit 70 performs setting of increasing a duty at 0.3%/ms as the acceleration during the start (step 213). When the set value is 4 or larger, the control circuit 70 performs setting of increasing the duty at 0.1%/ms similarly to the related art, as the acceleration during the start (step 214).

Next, whether or not the set value of the speed changing dial 17 is 2 or larger is determined (step 215). When the value is 2 or larger, similarly to the rotary tool 1 in a conventional example, the acceleration is performed to reach the target rotation speed of the set value set by the speed changing dial 17 and is stabilized at a constant speed (step 217). Moreover, the acceleration in this case is in accordance with the acceleration set in steps 213 and 214. When the set value of the speed changing dial 17 is smaller than 2 in step 215, the rotation speed is set to 12,000 rpm as the target rotation speed, and the spindle 30 is accelerated to reach the acceleration set in step 213 until the rotation speed reaches the target rotation speed (step 216). Next, the control circuit 70 determines whether or not the rotation speed of 12,000 rpm of the spindle 30 is detected for a predetermined time, for example, 10 ms (step 218). When the rotation speed is detected for the predetermined time, the constant-speed rotation is performed at the rotation speed set by the speed changing dial 17 (step 220). When the set value of the speed changing dial 17 is "1", the rotation speed of the spindle 30 is 9,600 rpm, and thus the spindle is decelerated from 12,000 rpm to 9,600 rpm. When the rotation speed of 12,000 rpm or higher is not detected for 10 ms or longer in step 218, whether or not a time of 1.2 seconds or longer elapses from the start is determined, and the process returns to step 218 when the time of 1.2 seconds or longer does not elapse (step 219). When the time of 1.2 seconds or longer elapses in step 219, a temporally sufficient accelerating time elapses, and thus sufficient fastening of the washer nut 45 is performed during the start so that the process proceeds to step 220. Step 219 is a step for stabilizing the target rotation speed with the setting of the speed changing dial 17, even when a load is applied to the grindstone 40 immediately after step 211, and the rotation speed of the spindle 30 does not reach 12,000 rpm. By the procedure described above, the control circuit 70 performs constant-speed rotation control at the target rotation speed set by the speed changing dial 17 and rotates the motor until the switch lever 11 is turned off (step 221). Moreover, a procedure after the switch lever 11 is turned off in step 221 is as shown in the flowchart of FIG. 8.

As described above, in the second example, when a dial value is 4 or larger, the start is performed through a soft start as before so that the fastening force is applied to the washer nut 45 similarly to a conventional rotary tool. Then, when the switch is turned off before the elapse of a time T2 during which the required rotation state is set, control is performed not to apply the brake. On the other hand, when the dial value is 3 or smaller, the rotation is performed at a one-end high speed (for example, duty of 50%) during the start so that torque in a fastening direction is highly applied, and thereby the washer nut 45 is sufficiently fastened. Then, the rotation is performed at a constant speed (duty of 40%). When the switch is turned off before the time T2 elapses, the rotary tool is stopped by inertia without applying the brake, and the washer nut 45 is prevented from being loosened.

Figure 13:
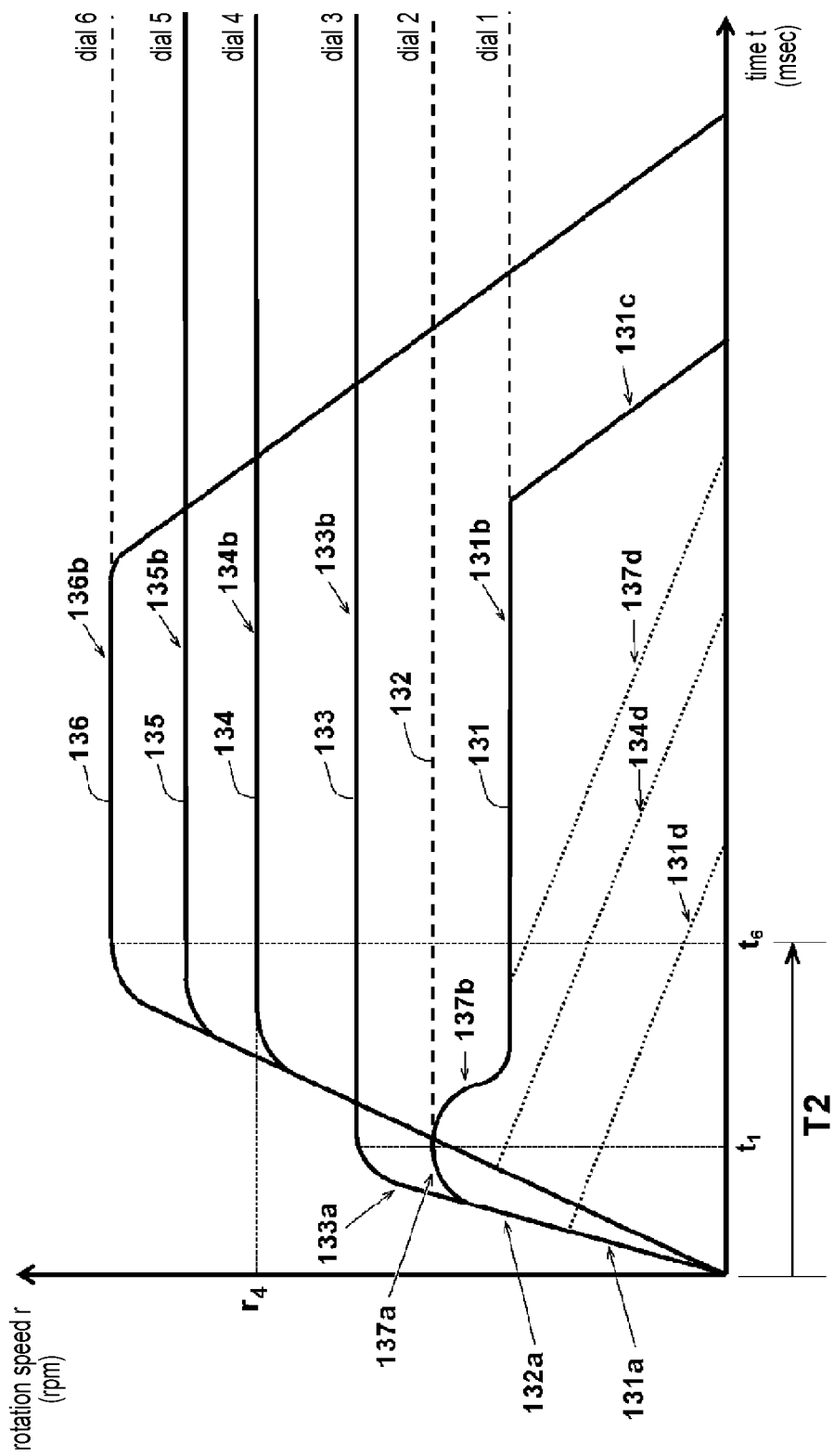
FIG. 13 is another graph for illustrating a speed setting dial and an acceleration/deceleration state of the motor.

Next, a variation example of the second example is described with reference to FIG. 13. In the graph shown in FIG. 11, the threshold used to determine whether or not to apply the electric brake after the acceleration reaches an acceleration value is set based on the time T1 (=0 to the time point $t_1$) until the constant-speed rotation is performed during rotation when the dial setting value is 3. However, in the variation example, the threshold is set based on the time T2 (=0 to the time point $t_6$) until the constant-speed rotation is performed when the dial setting value indicates the maximum rotation. Other control is the same as described above. Here, when the switch lever 11 is turned off before the elapse of the time point $t_1$, the rotation is stopped by inertia without applying the electric brake as shown by the arrows 131d and 134d. In addition, even in the constant-speed rotation state shown by the arrow 131b at the rotation speed 131, when the switch lever 11 is turned off before the time point $t_6$ which is the threshold, the speed is reduced due to inertia without applying the electric brake as shown by an arrow 137d. When the switch lever 11 is turned off after the time point $t_6$ which is the threshold, the rotation of the tip tool is immediately stopped by applying the electric brake as shown by the arrow 131c. Moreover, the present invention is not limited to using the elapsed time T2 as the threshold used to determine the "required rotation elapse" state, and the detection may be performed using an actual rotation speed.

As described above, the present invention is described based on the examples; however, the present invention is not limited to the examples described above, and it is possible to perform various modifications in a range not departing from the gist of the present invention. For example, in the examples described above, the grinder that rotates the grindstone or the like attached to the spindle 30 with an electric motor as a power source is described as an example of the rotary tool 1; however, the rotary tool is not limited to the grinder, and the rotary tool may be another rotary tool as long as the rotary tool has a rotary shaft that is rotated by a power source and a tip tool that is fixed to the rotary shaft using a fastener such as a washer nut. In addition, the power source of the present invention is not limited to the electric motor, and any power source may be used. Further, brake means of the present invention is not limited to the electric brake which causes the short circuit between the coils of the motor, and a mechanical brake or other brake means may be used.

What is claimed is:

1. A rotary tool which rotates a spindle and a tip tool forward or backward by a motor, and uses a fixture screwed with the spindle to install the tip tool on the spindle,
   the rotary tool comprising:
   a switch; and
   a control device which controls a rotation and a stop of the motor corresponding to an operation of the switch,
   wherein when the switch is turned on, the control device is configured to perform a start control that controls the motor to a second target rotation speed higher than a first target rotation speed before controlling the motor to a constant-speed rotation at the first target rotation speed.

2. The rotary tool according to claim 1, wherein the motor is a brushless motor and has an inverter circuit which comprises a plurality of switching elements for controlling the motor, and the control device adjusts the braking force by controlling the inverter circuit.

3. The rotary tool according to claim 1, wherein during the start control, the control device controls the motor to gradually decrease a rotation speed of the motor to reach the first target rotation speed after increasing the rotation speed of the motor to the second target rotation speed.

4. The rotary tool according to claim 1, comprising a speed adjusting device capable of being operated by an operator,
   wherein the control device is capable of selecting a low speed control or a high speed control according to an operation of the speed adjusting device.

5. The rotary tool according to claim 4, wherein in a case when the low speed control is selected, the control device performs the start control, and
   wherein in a case when the high speed is selected, the control device does not perform the start control.

6. The rotary tool according to claim 4, wherein among the low speed control and the high speed control, the control device performs the start control only when the low speed control is selected.

7. The rotary tool according to claim 4, wherein during a driving of the motor, the control device is capable of performing a braking control to apply a braking force to the motor when the switch is turned off.

8. The rotary tool according to claim 7, wherein the control device sets a first braking force, which is applied to the motor if the switch is turned off before a predetermined period elapses after a start of the motor, to be weaker than a second braking force, which is applied to the motor if the switch is turned off after the predetermined period elapses after the start of the motor.

9. The rotary tool according to claim 7, wherein at least during the high speed control is selected, the control device adjusts the braking force such that a loosening torque applied to the fixture during a braking of the motor is smaller than a fastening torque applied to the fixture during a start of the motor.

10. A rotary tool, comprising:
a spindle, configured to mount a tip tool;
a motor, configured to rotate the spindle;
a fixture, configured to be screwed to the spindle for fixing the tip tool;
a switch;
a speed adjusting device, configured to be operated by an operator, the speed adjusting device is configured to be able to selectively set a target rotation speed to a first rotation speed or a second rotation speed higher than the first rotation speed;
a control device, configured to control a rotation and a stop of the motor corresponding to an operation of the switch, the control device is configured to control a rotation of the motor to the first rotation speed or the second rotation speed that is set,
wherein when the target rotation speed is the first rotation speed, the control device is configured to control an excess amount, which is an amount by which the rotation speed of the motor to temporarily exceed the target rotation speed in a process before the motor is driven at the target rotation speed, so as to be larger compared with when the target rotation speed is the second rotation speed.

11. The rotary tool according to claim 10, wherein during a driving of the motor, the control device is capable of performing a braking control to apply a braking force to the motor when the switch is turned off.

12. The rotary tool according to claim 11, wherein the control device sets a first braking force, which is applied to the motor if the switch is turned off before a predetermined period elapses after a start of the motor, to be weaker than a second braking force, which is applied to the motor if the switch is turned off after the predetermined period elapses after the start of the motor.

13. The rotary tool according to claim 10, wherein the speed adjusting device is configured to set the target rotation speed to the first rotation speed, the second rotation speed and a third rotation speed, the first rotation speed and the third rotation speed are smaller than the second rotation speed,
wherein the first rotation speed is a lowest speed of the target rotation speed, and the second rotation speed is a highest speed of the target rotation speed.

14. A rotary tool, comprising:
a spindle, configured to mount a tip tool;
a motor, configured to rotate the spindle;
a fixture, configured to be screwed to the spindle for fixing the tip tool;
a switch, configured to be operated by an operator;
a speed adjusting device, configured to be operated by the operator, the speed adjusting device is configured to be set to one of a first target rotation speed or a second target rotation speed, the first target rotation speed is smaller than the second target rotation speed;
a control device, configured to control the motor to start the motor and rotate the motor at the first target rotation speed or the second rotation speed when the switch is turned on, and the control device is configured to brake the motor when the switch is turned off,
wherein the control device is configured to change a control of starting the motor, and a control of braking the motor based on a setting on the speed adjusting device.

15. The rotary tool according to claim 14, wherein the control device is configured to change a first acceleration of the motor in an acceleration direction when starting the motor, and change a second acceleration of the motor in a deceleration direction when braking the motor, based on the setting on the speed adjusting device.

16. The rotary tool according to claim 14, wherein when one of the first target rotation speed or the second target rotation speed is set, the control device is configured such that the first acceleration of the motor in the acceleration direction when starting the motor is larger than the second acceleration of the motor in the deceleration direction when braking the motor.

17. The rotary tool according to claim 14, wherein the control device is configured such that:
when the switch is operated such that the motor is braked right after the motor reaches the first target rotation speed after the motor is started, the motor is decelerated by a first braking force, and
when the switch is operated such that the motor is braked right after the motor reaches the second target rotation speed after the motor is started, the motor is decelerated by a second braking force,
wherein the second braking force is larger than the first braking force.

18. The rotary tool according to claim 14, wherein the control device is configure to control the motor such that:
a first force is applied to the fixture to fasten the fixture in a process from when the motor is started to when the motor is rotated at the first target rotation speed,
a second force is applied to the fixture to fasten the fixture in a process from when the motor is started to when the motor is rotated at the second target rotation speed,
wherein the first force is smaller than the second force,
wherein the control device is configured to decelerate the motor by a first braking force if the switch is turned off when the motor is being driven at the first target rotation speed,
wherein the control device is configured to decelerate the motor by a second braking force if the switch is turned off when the motor is being driven at the second target rotation speed,
wherein the second braking force is larger than the first braking force.

* * * * *